United States Patent [19]
Havens et al.

[11] Patent Number: 5,184,745
[45] Date of Patent: Feb. 9, 1993

[54] STORAGE CONTAINER SET

[75] Inventors: Petrina L. Havens, 39053 Polo Club 104, Farmington Hills, Mich. 48335; Jeffrey L. Havens, Farmington Hills, Mich.

[73] Assignee: Petrina L. Havens, Farmington Hills, Mich.

[21] Appl. No.: 731,748

[22] Filed: Jul. 16, 1991

Related U.S. Application Data

[63] Continuation-in-part of Ser. No. 636,481, Dec. 31, 1990, abandoned.

[51] Int. Cl.⁵ .............................................. B65D 21/00
[52] U.S. Cl. ................................. 220/23.83; 220/366
[58] Field of Search ................ 220/23.83, 23.86, 366; 206/514

[56] References Cited

U.S. PATENT DOCUMENTS

| | | | |
|---|---|---|---|
| 1,671,025 | 5/1928 | Franzmeier | 220/366 |
| 2,054,094 | 9/1936 | Murch | 220/366 X |
| 2,575,770 | 11/1951 | Roop | 206/514 |
| 3,391,850 | 7/1968 | Torgerson et al. | 229/43 |
| 3,623,634 | 11/1971 | Norgard | 220/4.27 X |
| 3,854,582 | 12/1974 | Martinelli | 206/508 |
| 3,954,178 | 5/1976 | Mason, Jr. | 206/508 |
| 4,091,953 | 5/1978 | Daenen | 220/23.86 |
| 4,144,968 | 3/1979 | Shelton | 220/366 X |
| 4,161,252 | 7/1979 | Howells | 211/126 |
| 4,450,960 | 5/1984 | Johnson | 206/334 |
| 4,646,933 | 3/1987 | Jurczenia et al. | 220/366 |
| 4,951,832 | 8/1990 | Tenney et al. | 220/23.83 |

Primary Examiner—Steven M. Pollard
Attorney, Agent, or Firm—Baker & Daniels

[57] ABSTRACT

A storage container set wherein the individual containers are sized and configured to be nestable one within the other during storage of the set. Each container includes a rim depending downwardly from the underside of the container and having a plurality of vertical slots formed therein. The container lid is removably affixed to the underside of the container during storage of the container set in the nested condition by way of an interlocking arrangement between the rim and an annular groove disposed in a face of the lid, or interlocking buttons or recesses.

6 Claims, 3 Drawing Sheets

5,184,745

STORAGE CONTAINER SET

BACKGROUND OF THE INVENTION

This is a continuation-in-part of application Ser. No. 7/636,481, filed Dec. 31, 1990, now abandoned.

The present invention relates generally to storage containers, and more particularly to a storage container set wherein the individual storage containers and lids are sized and configured to be nestable one within the other during storage of the container set.

It has become common for the normal household to include numerous containers and lids for storing food and various other articles. It is not uncommon to find these storage containers and lids stored in random fashion in a cabinet, cupboard, or the like, with the lids being stored in a similar random fashion, or even in another cabinet, etc. This random storage of the containers and lids can be extremely inconvenient and annoying to a user attempting to match a container with a lid, and may cause the loss of a particular container or lid from the set.

With the increasing importance attached to finding ways to decrease the amount of solid waste generated in today's society, the search for acceptable alternatives to non-biodegradable plastic wraps and similar disposable containers may be expected to increase. As a result, it is believed that the use of suitably-sized non-disposable storage containers may become more prevalent. Due to improved methods of forming these containers and lids, as well as their improved strength and resistance from wear, the particular uses to be found for these containers is expected to continue to expand. In order to encourage the use of such a container set, and to save precious space in what is becoming an increasingly-crowded kitchen area, it has become important to provide a means to store a container set so that the set occupies a minimal amount of space, yet is arranged so that the containers and lids are conveniently accessible to the user.

SUMMARY OF THE INVENTION

The present invention solves the problems of the prior art by providing a storage container set wherein non-disposable storage containers and lids of different sizes are provided, the containers and lids being sized and configured to be nestable one within the other during storage of the set. The respective lids for the containers are removably affixed by way of fastening means to the underside of the bottom of the respective containers during storage of the set.

An advantage of the present invention is that it provides a convenient arrangement for storing a storage container set so that the set occupies only a minimal amount of space as compared to storing the containers and lids in loose condition, or in stackable condition.

Another advantage of the present invention is that it provides an arrangement wherein each container and its respective lid are stored together, so that the risk of loss or separation is minimized.

A further advantage of the present invention is that the lids are removably affixed to the containers in a relatively simple manner that does not require the addition of expensive or awkward fastening apparatus to the container or the lid.

A still further advantage of the present invention is that it decreases the perceived need to utilize non-biodegradable, discardable plastic wraps or containers.

Yet another advantage of the present invention is that the storage of the containers in nested condition enables the respective containers and lids to remain clean during storage, resulting in improved sanitation when compared to containers and lids stored in loose condition.

The present invention, in one form thereof, comprises a storage container set having a plurality of open topped storage containers sized and configured to be nestable one within the other during storage of the container set. Each of the containers has a bottom portion axially opposite the open top. Respective cover means engageable with each of the containers are provided for sealing the open top. Fastening means are provided for removably affixing the respective cover means to an underside of each respective bottom portion during storage of the container set, so that the containers and cover means may be stored in nestable condition.

The fastening means may comprise a rim having a plurality of generally vertical slots formed therein depending from the underside of the bottom portion of the container that interlocks with a groove disposed in a face of the cover means. In another embodiment, the fastening means comprises a plurality of buttons depending from the underside of the bottom portion, wherein each of the buttons is engageable with a corresponding one of a plurality of recesses disposed in a face of the cover means. In yet another embodiment, the cover means comprises a button positioned substantially in the center of a face of the cover means, which button interlocks with a mating socket positioned substantially in the center of the underside of the container.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
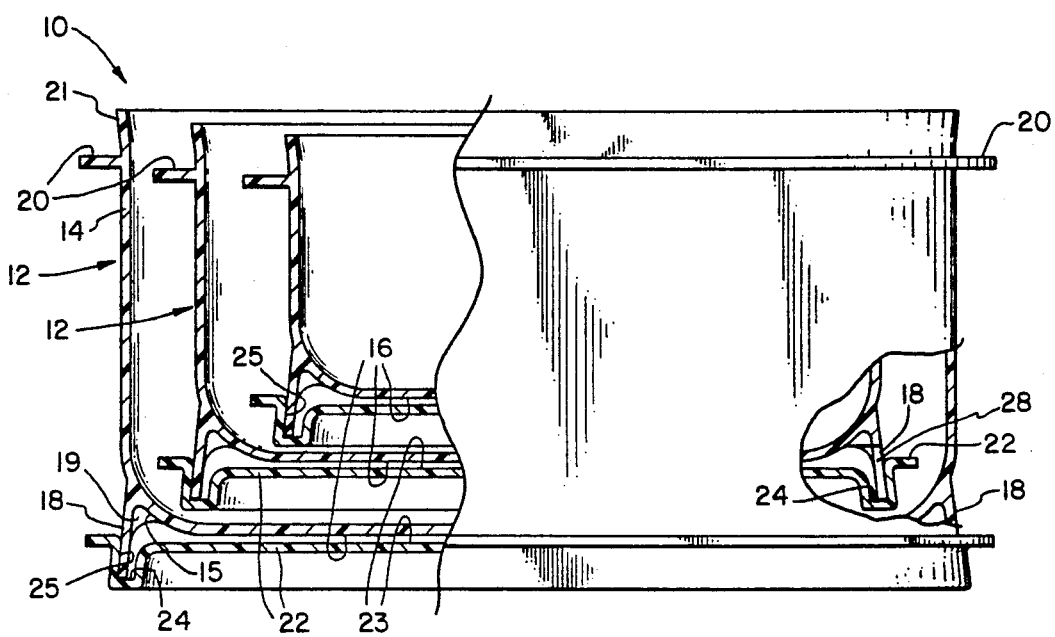
FIG. 1 is a side elevational view of the storage container set of the present invention, with portions of the outer container cut away in order to show the attachment of the lids to the containers during storage of the set, and to show the nested condition of the containers and lids.

Referring now to the drawings, and particularly to FIG. 1, a storage container set 10 is shown in accordance with the present invention. Storage container set 10 includes a plurality of storage containers 12 sized and configured to be nestable during storage of container set 10 as shown in FIG. 1. Preferably, storage containers 12 have a generally cylindrical body 14, although container sets including containers having other body shapes may similarly be utilized.

Figure 2:
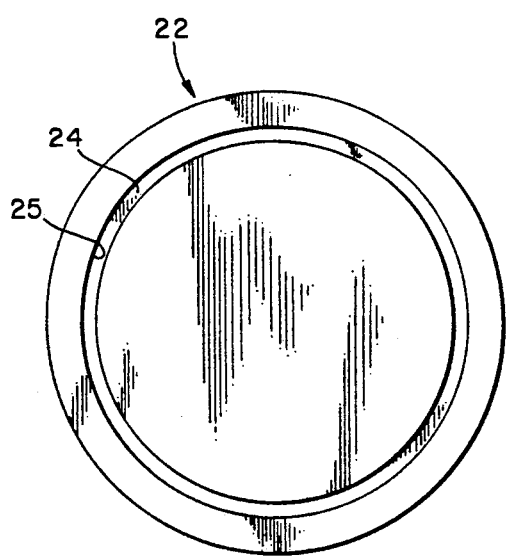
FIG. 2 is a plan view of the inside face of a lid of a storage container set in accordance with the present invention.
Figure 3:
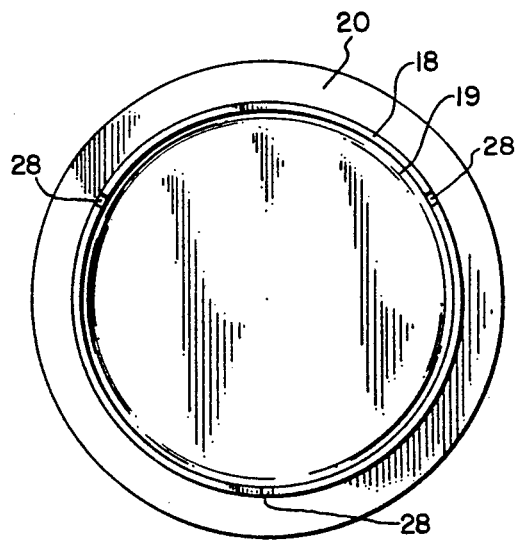
FIG. 3 is a bottom view of a container in accordance with the present invention.

In the embodiment of FIG. 1, generally cylindrical container body 14 is open at the top, and has a generally flattened bottom portion 16. Bottom portion 16 may include a rounded portion 15, providing a smooth transition between cylindrical body portion 14 and the remainder of bottom portion 16. As shown in FIGS. 1 and 3, container 12 includes a rim 18 depending from the underside of the container, preferably from rounded portion 15 of bottom 16. Rim 18 is utilized when removably affixing a lid to underside bottom portion 16, in a manner to be described hereinafter, and also may serve as a base upon which the container and lid may be supported. With a generally cylindrical container body of the type shown in the embodiment of FIGS. 1-3, rim 18 comprises an annular ring. A web portion 19 may be provided between rim 18 and rounded bottom portion 15 to strengthen the attachment therebetween and to further support the rim.

Figure 10:
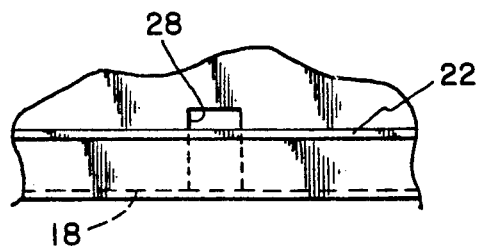
FIG. 10 is a side elevational view of a portion of the nested container-lid arrangement shown in FIG. 1, showing slot 28 extending vertically beyond the lip of container lid 22.

As best shown in FIGS. 3 and 10, a plurality of vertical slots 28 are formed in rim 18. Slots 28 provide ventilation of annular groove 24 of lid 22 when the lid is secured to rim 18, so that an air flow may be maintained between lid 22 and the underside of container 12. As a result, groove 24 is maintained virtually free of moisture, and an unfavorable environment for the growth of bacteria results from this arrangement. Lid 22 will be described in further detail hereinafter. Preferably, slots 28 are approximately one-eighth inch wide, and are arranged approximately equidistant from each other. In the embodiment shown in FIG. 3, three slots are spaced at arcuate angles of 120° from each other. Alternatively, a greater or lesser number of slots 28 may be formed in rim 18, the arrangement shown in FIG. 3 merely represents the preferred embodiment.

Each container 12 may also include flange 20 to impart added strength to the body of the container and/or to serve as a stop when a lid is placed on container 12 to seal the open top. In the embodiment of FIG. 1, flange 20 has the form of a collar surrounding generally cylindrical body portion 14. Preferably, a portion 21 of the generally cylindrical body of container 12 extends about 5/16 inch above flange 20 and flares outwardly approximately 7° to provide a secure interlock between container 12 and lid 22 during closure of the container. Container 12 and lid 22 are each formed from a material having sufficient resiliency so that closure may be effected by a "snap fit" between the container and the lid. In a typical arrangement, the cylindrical wall of container 12 may be approximately 0.060 inch thick, although this thickness may be varied depending upon the particular plastic or other material used to form container 12, and upon the particular strength desired in the body of the container.

Lid 22 is provided to seal the open top of each container 12. Each lid is sized and configured to seal the open top of a corresponding container. An annular groove 24 is formed in a face of lid 22, preferably the inside face, as shown in FIGS. 1 and 2. In the snap fit closure of container 12, container body rim portion 21 is received in annular groove 24. In a typical arrangement, annular groove 24 has a width of approximately 0.125 inch, and a depth of approximately 0.25 inch. The corresponding lids and containers may be color-coded according to size for added convenience during washing, etc., so that the appropriate containers and lids may be easily matched.

When containers 12 of storage container set 10 are not being used to store articles, they are arranged and stored in nested condition as shown in FIG. 1. The container having the open top with the largest diameter is, of course, the outermost container, with the remainder of the containers being arranged in descending order based upon the respective diameters of the open tops of the containers. During storage of set 10, each lid 22 is removably affixed by means of a snap fit to rim 18 at the bottom of container 12. In a preferred form, rim 18 flares outwardly approximately 7° from the vertical and interlocks with the outer surface 25 of annular groove 24, which has a similar 7° taper from the top to the bottom of the groove. Upper rim 21 may be similarly tapered.

Figure 4:
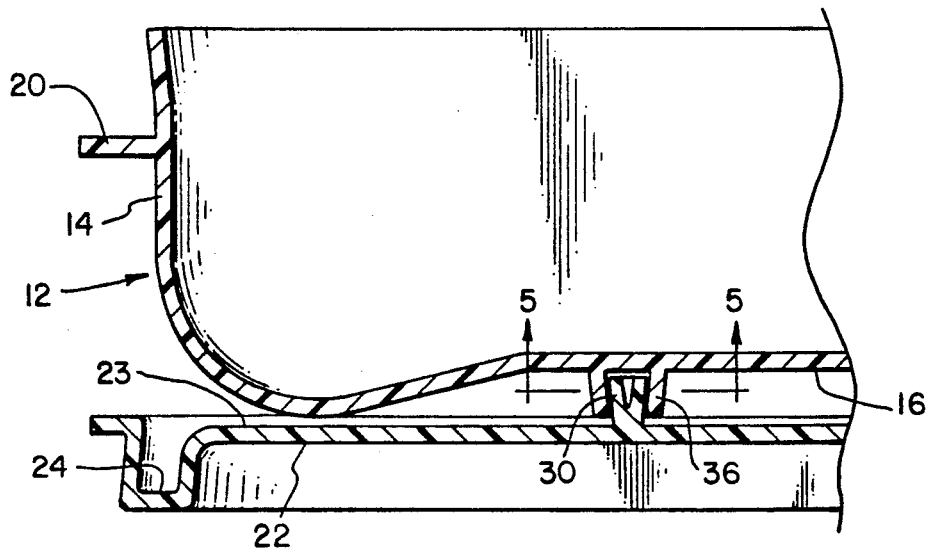
FIG. 4 is a fragmentary sectional view of a container having a lid removably affixed to its underside in accordance with another embodiment of the present invention.
Figure 5:
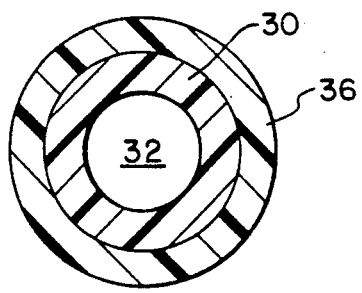
FIG. 5 is an enlarged sectional view showing the attachment of the container and the lid, taken along line 5—5 of FIG. 4 and viewed in the direction of the arrows.
Figure 6:
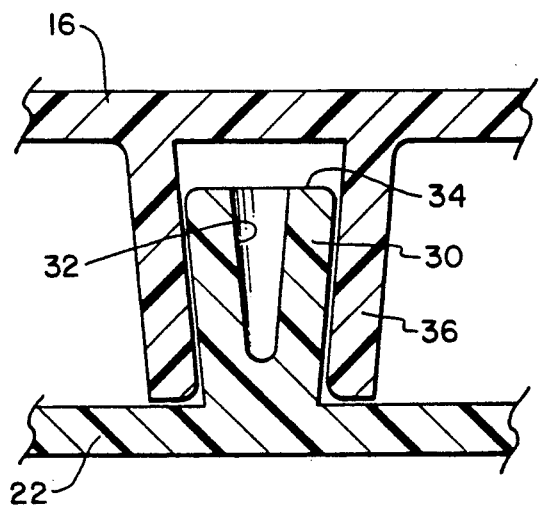
FIG. 6 is an enlarged sectional view showing the attachment of the lid to the container in the embodiment shown in FIG. 4.

FIG. 4 shows an alternate arrangement for the attachment of lid 22 to container 12 during storage of storage container set 10. Button 30 has the general shape of a post and protrudes from inner face 23 of lid 22 in a generally perpendicular direction. Alternatively, container set 10 may be designed so that button 30 protrudes from the outer face of lid 22. The diameter of post 30 increases slightly in the axial direction away from lid 22. Thus, post 30 has a minimum diameter at its attachment to lid 22, which diameter increases to a maximum at end 34 of post 30. Cavity 32 (FIG. 6) extends axially inwardly from end 34 toward lid 22, decreasing in diameter as it approaches lid inner face 23. Annular receptacle 36 projects downwardly from bottom 16 of container 12. The outer body of receptacle 36 tapers slightly inwardly as it projects from bottom portion 16, and complements the outward taper of post 30. Unlike the embodiment shown in FIG. 1, the container shown in FIGS. 4–6 need not include rim 18. As a result of the presence of cavity 36 in post 30, the body portion of the post may be radially compressed so that post 30 is easily inserted into receptacle 36. When radially compressed end 34 of post 30 has been inserted into receptacle 36, the compression is released and post 30 resumes its shape as best shown in FIG. 6. Container 12 and lid 22 are now interlocked for storage of container set 10. The interlock of the container and lid during actual use of the container for storing articles is the same as in the previously-described embodiment.

Figure 7:
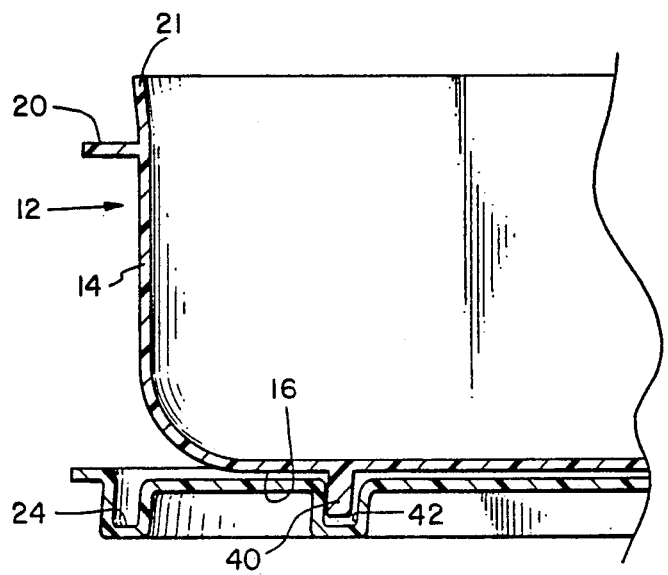
FIG. 7 is a fragmentary sectional view of another embodiment of the present invention, showing a portion of the fastening means whereby a button on the underside of the container is snap fit into a groove on the inner face of a corresponding lid.
Figure 8:
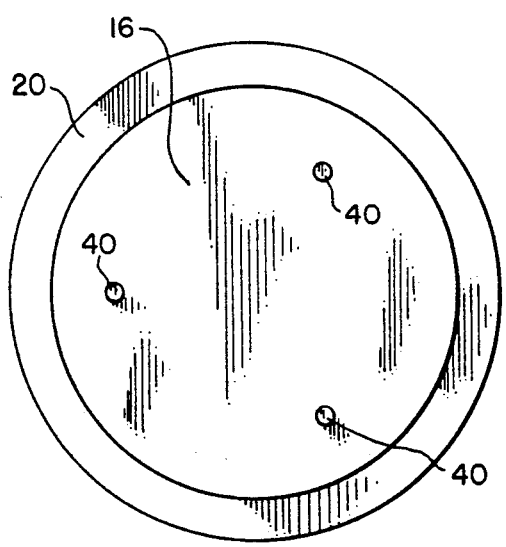
FIG. 8 is a bottom view of the storage container shown in the embodiment of FIG. 7.
Figure 9:
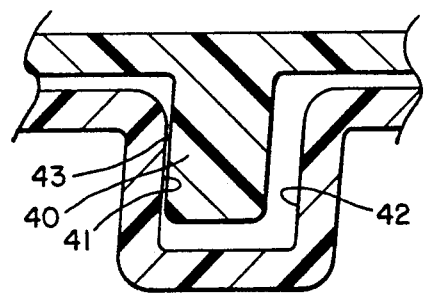
FIG. 9 is an enlarged sectional view of the portion of the fastening means shown in FIG. 7.

A further embodiment is shown in FIGS. 7-9. A plurality of buttons 40 are arranged along the underside of bottom 16 of container 12. Buttons 40 are preferably arranged approximately equidistant from each other, and are positioned near the periphery of bottom 16. In the embodiment shown in FIG. 8, three buttons are spaced at arcuate angles of 120° from each other. Alternatively, in a four button arrangement, the buttons are spaced 90° apart. A plurality of corresponding recesses 42 are disposed in a face of lid 22 to receive buttons 40. Generally, buttons 40 taper slightly outwardly approximately 7° from the vertical, and recesses 42 taper a like amount to cause surfaces 41 and 43 to frictionally lock, to thereby provide a secure interlock between lid 22 and container 12. With this arrangement of buttons 40 along the underside of the container the buttons may also serve as a base for the container during the storage of food or other articles.

The containers 12 and lids 22 are preferably made of a resilient plastic material similar to food storage containers currently in widespread use.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A storage container set comprising:
   a plurality of open topped storage containers, said containers being sized and configured to be nestable one within the other during storage of the container set, each of said containers having a generally cylindrical body and a generally circumferential bottom portion axially opposite said open top, said bottom portion having a lower annular rim depending from an underside thereof and flaring outwardly therefrom, said lower annular rim having a plurality of generally vertical slots formed therein, wherein said slots extend upwardly from a lowermost edge of said rim, each of said containers further having an upper annular rim flaring outwardly from an upper edge of said container, wherein said upper and lower annular rims have substantially the same outward flare; and
   a plurality of lids respectively sized and configured to be engageable with each of said containers, each of said lids having an annular groove disposed in the inner face of said lid, said annular groove having an outward flare and being sized and dimensioned for selectively receiving either said annular upper rim for sealing said container or said annular lower rim for removably affixing the lid to a respective underside of the bottom portion of a container during nested storage of the container set, said outward flare of the annular groove corresponding to said outward flare of the annular rims, said slots having a vertical dimension that exceeds the vertical extension of the corresponding lid when said lid is removably affixed to the underside of the respective container bottom portion.

2. The storage container set of claim 1, wherein said plurality of slots comprises three slots spaced generally equidistantly along said rim.

3. The storage container set of claim 2, wherein said annular rims and said annular groove flare outwardly about 7° from the vertical.

4. A storage container set, comprising:
   a plurality of open topped storage containers, said containers being sized and configured to be nestable one within the other during storage of the container set, each of said containers having a bottom portion axially opposite the open top;
   respective cover means engageable with each of said containers for sealing the open top; and
   fastening means for removably affixing said respective cover means to an underside of the bottom portion of each container during storage of the container set so that said containers and affixed cover means may be stored in nested condition; said fastening means including a rim depending from said underside of the bottom portion of each said container, said rim being engageable with a groove formed in a face of said cover means for removably affixing the respective cover means to the containers, said rim further including vent means for allowing a flow of air between said cover means and said container bottom portion when said rim is engaged with said groove; said storage containers having respective generally cylindrical bodies each having a generally circumferential bottom portion, and said depending rim comprising an annular ring, wherein said ring flares outwardly and interlocks with an inwardly tapered surface of said groove; and wherein said vent means comprises a plurality of generally vertical slots formed in said rim, said slots having a vertical dimension that exceeds the vertical extension of said cover means when said cover means is removably affixed to said underside of said container bottom portion.

5. The storage container set of claim 4, wherein said plurality of slots comprises three slots spaced approximately equidistantly along said rim.

6. The storage container set of claim 5, wherein each of said slots has a width of about 0.125 inch.

* * * * *